United States Patent Office 3,183,281
Patented May 11, 1965

3,183,281
STABLE SELF-CATALYZING EPOXY
RESIN COMPOSITIONS
David H. Clemens, Willow Grove, Pa., assignor to Rohm & Haas Company, Philadelphia, Pa., a corporation of Delaware
No Drawing. Filed July 19, 1961, Ser. No. 125,096
4 Claims. (Cl. 260—837)

The present invention is concerned with novel compositions and it is particularly concerned with compositions containing copolymers containing acid or anhydride groups and amine or quaternary ammonium groups in the form of their fluoroalkanoate salts as defined hereinafter, the latter salt groups serving as latent catalysts for the reaction of the copolymers with polyepoxides. The novel copolymers are adapted to be mixed with polyepoxides for the preparation of thermosetting coating compositions.

It is already known to employ amines and quaternary ammonium compounds for the curing or catalyzing of mixtures of poly(vicepoxides) in admixture with addition copolymers containing acids, such as of acrylic and methacrylic acid or anhydrides of dicarboxylic acids, such as maleic anhydride. However, such compositions are generally quite unstable when the usual amines, salts thereof, or quaternary ammonium salts are used as the catalyst. Thus, it is not unusual for the mixture of acid or anhydride copolymer, polyepoxide and catalyst to gel in a period of one or two weeks time under normal conditions of storage.

United States Patent 2,662,870 discloses the copolymerization of vinylpyridine with styrene, ester, and acid comonomers, and the mixing of the copolymer with polyepoxides to form coating compositions in which the polymerized vinylpyridine serves to catalyze the reaction of the copolymer and polyepoxide. However, these mixtures also lack stability and must be used rather promptly after preparation.

In accordance with the present invention, it has been discovered that an acid or anhydride copolymer containing basic amine or quaternary ammonium groups which have their basic groups substantially neutralized with certain fluoroalkanoic acid salts can be prepared which, when mixed with polyepoxides, are capable of providing a fast and efficient cure at normal curing temperatures and yet allow the composition containing the copolymer and the polyepoxide to be stored at normal room temperature for a period of some months without undergoing excessive gelation.

The copolymers of the present invention are those prepared from a mixture of monoethylenically unsaturated monomers containing a $H_2C=C<$ group comprising (1) about 0.25% to 10% by weight of at least one monomer having a basic group selected from the group consisting of amine and quaternary ammonium groups and (2) either (a) from 1 to 35% by weight of an $\alpha,\beta$ monoethylenically unsaturated acid, especially acrylic acid, methacrylic acid, itaconic acid, maleic acid, fumaric acid, crotonic acid, or aconitic acid, or (b) those containing 3 to 15% by weight of an acid anhydride, such as maleic anhydride, itaconic anhydride, citraconic anhydride, and dimethyl maleic anhydride. Of course, the copolymer may contain a mixture of acids up to a total amount of 35% by weight in the copolymer or a mixture of anhydrides up to 15% by weight in the copolymer. Preferably, the amount of acid is from 10 to 20% by weight of the copolymer. The balance of the copolymer may be formed of any monoethylenically unsaturated copolymerizable compound or a mixture thereof. Examples of comonomers that may be employed include styrene, vinyltoluene, methyl methacrylate, acrylonitrile, methacrylonitrile, vinyl acetate, vinyl chloride, vinylidene chloride, and other esters of an acid of the formula

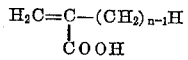

in which $n$ is an integer having a value of 1 to 2, especially the esters with a saturated monohydric aliphatic alcohol having 1 to 18 carbon atoms. Examples of the latter monomers include methyl acrylate, ethyl acrylate, n-butyl acrylate, n-butyl methacrylate, 2-ethylhexyl acrylate and methacrylate, dodecyl acrylate and methacrylate, and octadecyl acrylate or methacrylate.

Particular copolymers, for example, include a copolymer of 20 to 80% by weight of styrene, 10 to 20% by weight of acrylic acid, ¼ to 10% by weight of dimethylaminoethyl methacrylate, and the balance of ethyl acrylate or methyl acrylate; copolymers of 70 to 90% by weight of methyl methacrylate with 30 to 10% by weight of methacrylic acid and ¼ to 10% of 4-vinylpyridine; and copolymers of 50 to 80% by weight of methyl methacrylate or acrylonitrile with 10 to 25% by weight of acrylic acid or methacrylic acid and ¼ to 10% by weight of 3-methacryloxypyridine, and the balance of ethyl acrylate to make 100% by weight in the copolymer. A number of the aforementioned copolymers and their preparation are described and claimed in U.S. patent application Serial No. 795,592, filed on February 26, 1959, now Patent 3,136,736 in the hands of a common assignee and the disclosure of these copolymers in that application is incorporated herein by reference.

Instead of copolymerizing two separate monomers to supply the reactive acid and basic functions, a single monomer may be used to supply both functions. Examples of monomers of this type include the monoesters of $\alpha,\beta$-monoethylenically unsaturated dicarboxylic acids, such as maleic acid, fumaric acid, itaconic acid, mesaconic acid, or citraconic acid, with an aminoalcohol or an alcohol containing a quaternary ammonium group, such as dimethylaminoethanol and $\beta$-hydroxyethyltrimethylammonium hydroxide.

The invention also contemplates blends of copolymers of which one or more contain only part or all of the acid function and one or more other copolymers therein contain part or all of the basic function or in which two or more copolymers may contain both acid and basic functions but in different relative proportions in several thereof.

The copolymers of the present invention may be produced by copolymerization of the mixture of the acid monomer, the basic monomer, and the other monoethylenically unsaturated monomer or monomers. Then the copolymer may be at least partially, and preferably completely, neutralized with fluoroalkanoic acid defined hereinafter. Alternatively, the basic monomer may be neutralized with the fluoroalkanoic acid before copolymerization.

The copolymerization may be affected by conventional bulk or solution methods using free radical initiators such as dicumyl peroxide or di-tert-butyl peroxide at temperatures of 100–150° C. or any of the conventional azo catalysts at temperatures of 40 to 100° C. The polymerization may be effected in the inert solvent which is intended to be used for coating or impregnating operations.

Organic solvents that may be employed include any suitable inert solvent such as the aromatic, naphthenic, or aliphatic hydrocarbons including especially benzene, toluene, and xylenes, esters such as ethyl acetate, butyl acetate, amyl acetate, 2-(ethoxy)-ethyl acetate, ketones such as acetone, methyl ethyl ketone, and methyl isobutyl ketone, ethers such as dioxane, the monomethyl ether of diethylene glycol, and so on.

The amine-containing monomers may be those of any of the Formulas I, II, or III following:

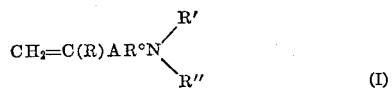
(I)

where

R is selected from the group consisting of H and CH₃,
A is selected from the group consisting of —O—, —S—,

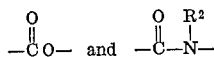

in which R² is selected from the group consisting of H and saturated aliphatic hydrocarbon groups having 1 to 12 carbon atoms, R° is selected from the group consisting of straight and branched chain alkylene groups having 2 to 10 carbon atoms, of which at least two extend in a chain between the adjoined N atom and A group, R', when not directly connected to R'', is selected from the group consisting of H, hydroxyalkyl groups containing 2 to 4 carbon atoms and saturated aliphatic hydrocarbon groups having 1 to 10 carbon atoms, R'', when not directly connected to R', is selected from the group consisting of H, hydroxyalkyl groups containing 2 to 4 carbon atoms and saturated aliphatic hydrocarbon groups having 1 to 10 carbon atoms, R' and R'', when directly connected together, form with the N atom a residue of a heterocyclic nucleus selected from the group consisting of morpholine, piperazine, pyridine, pyrrolidine, and N-alkyl-piperazine in which the alkyl group has 1 to 18 carbon atoms, such as methyl, ethyl, isopropyl.

Examples of the compounds of Formula I include:

N-(3-dimethylamino)propyl methacrylamide
N-(β-dimethylamino)ethyl acrylamide
N-(β-dimethylamino)ethyl methacrylamide
10-aminodecyl vinyl ether
8-aminooctyl vinyl ether
Diethylaminohexyl methacrylate
Diethylaminoethyl vinyl ether
5-aminopentyl vinyl ether
3-aminopropyl vinyl ether
2-aminoethyl vinyl ether
2-aminobutyl vinyl ether
4-aminobutyl vinyl ether
Dimethylaminoethyl methacrylate
Dimethylaminoethyl vinyl ether
N-(3,5,5-trimethylhexyl)aminoethyl vinyl ether
N-cyclohexylaminoethyl vinyl ether
N-methylaminoethyl vinyl ether
N-2-ethylhexylaminoethyl vinyl ether
Vinyl β-dimethylaminopropionate
3-dimethylamino-2,2-dimethyl-propyl methacrylate
Methacrylate of N-hydroxyethyl-2,4,4-trimethyl-pyrrolidine
1-dimethylamino-2-propyl methacrylate
β-Morpholinoethyl methacrylate
4-(β-acryloxyethyl)-pyridine
3-(β-methacryloxyethyl)-pyridine
β-Pyrrolidinoethyl vinyl ether
5-aminopentyl vinyl sulfide
β-Hydroxyethylaminoethyl vinyl ether
(N-β-hydroxyethyl-N-methyl)aminoethyl vinyl ether, and
Hydroxyethyldimethyl(vinyloxyethyl)ammonium hydroxide

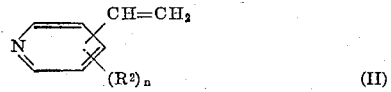
(II)

where R² is H or alkyl of 1 to 12 carbon atoms and $n$ is an integer having a value of 1 to 4. Examples include 2-vinylpyridine;
3-vinylpyridine;
4-vinylpyridine;
2-methyl-5-vinylpyridine;
5-methyl-2-vinylpyridine;
4-methyl-2-vinylpyridine;
2-ethyl-5-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
3-dodecyl-4-vinylpyridine;
2,4-dimethyl-5,6-dipentyl-3-vinylpyridine;
2-decyl-5-(α-methylvinyl)-pyridine.

Another class of amine-containing monomers that may be used is that of Formula III:

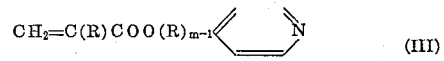
(III)

where R and R° are defined above and $m$ is an integer having a value of 1 to 2. Examples include:

3-(4-pyridyl)-propyl methacrylate,
2-(4-pyridyl)-ethyl methacrylate, and
2-(4-pyridyl)-ethyl acrylate,
3-methacryloxypyridine.

Any of the amine-containing monomers so far mentioned, and especially those containing tertiary amine groups, may be quaternized by alkylation to form quaternary monomers which can be copolymerized. The quaternization may be effected by use of a suitable alkylating agent (which is herein intended to include aralkylating agents and substituted aralkylating agents), such as methyl chloride, ethyl chloride, benzyl chloride, allyl chloride, substituted allyl chloride, e.g. dodecylallyl chloride, dodecenyl chlorides, alkylenbenzyl chlorides, e.g., octylbenzyl chlorides (from diisobutylene), any chloromethylated aromatic-like compound, e.g., chlorobenzyl chloride, chloromethylated thiophene, chloromethylated furan, chloromethylated naphthalene, or corresponding bromides or iodides, e.g., phenoxyethyl bromide, methyl iodide; dimethyl sulfate, dimethyl sulfite, dimethyl phosphite, ethylene oxide, propylene oxide, styrene oxide, and butylene oxide.

Besides direct copolymerization of the several monomers including acid and amine or quaternary ammonium monomers, the copolymers may be obtained from polymers containing precursor groups such as polymers of acrylonitrile or of esters of acrylic or methacrylic acid by suitable reaction such as partial hydrolysis to introduce carboxyl groups and partial aminolysis with certain diamines to introduce amine or quaternary groups (as in U.S. Patent 2,980,657) with or without acid groups, alkylations of copolymers containing amine groups (2,981,657); partial esterification of acid-containing copolymers with amino alcohols (as in U.S. Patent 2,847,403) or preliminary partial hydrolysis as above followed by partial esterification.

The fluoroalkanoic acid that may be used to neutralize the amine or quaternary ammonium monomer or the copolymers containing acid and either amine or quarternary ammonium groups is selected from the group consisting of those having the formula

(IV)

where R is selected from the group consisting of fluorine, bromine, chlorine, methyl, ethyl, halomethyl, and haloethyl. Examples of these acids include difluoroacetic acid, trifluoroacetic acid, chlorodifluoroacetic acid, α,α'-difluoropropionic acid, perfluoropropionic acid, and perfluorobutyric acid.

The fluoroalkanoate salt copolymers are quite stable and may be stored and shipped to the point of compounding. They are useful as such to form coating compositions applicable to all sorts of substrates, such as paper, wood, textiles, leather, flooring materials, e.g., vinyl tile, asbestos-vinyl tile, asphalt tile, wood, also masonry of all types, e.g., concrete, stone, brick, and asbestos-cement shingles and siding. When compounded with wax and alkali soluble resins, they form excellent floor polish materials adapted to be removed by application of either dilute acid or dilute alkaline solutions. In these applications, the copolymers remain thermoplastic and soluble in character.

The copolymers of the present invention are especially useful in formulations with polyepoxide resins, with which the acid function of the copolymer coreacts under the catalytic influence of the amine or quarternary ammonium group when released under heating of the copolymer fluoroalkanoate salt. When used for this purpose the basic groups should be substantially neutralized by the fluoroalkanoic acid. This may be accomplished by treatment of the basic monomer or copolymer with an amount of the acid which is at least approximately stoichiometrically equivalent to the basic groups to be neutralized. The variation from the strict stoichiometric relationship may be up to 10% either way especially when the copolymer is to be neutralized but is preferably within 5%.

The poly(vic-epoxides) that may be used are resin-forming polyethers containing a plurality of vic-epoxide groups and include the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epichlorohydrin with bis-(4-hydroxyphenyl)-2,2-propane may be formulated as follows:

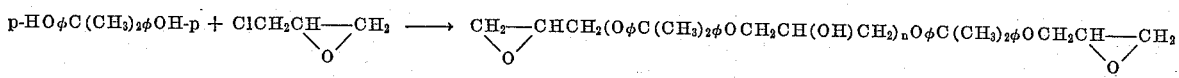

where $\phi$ is the phenylene group and $n$ has an average value varying from around zero to about 7. These resins may be made by the method disclosed in 2,324,483, 2,444,333, British Patents 518,057 and 579,698. Many of these ethoxyline resins are sold under the name of Epon resins by Shell Chemical Corporation or Araldite resins by the Ciba Company. Data on the Epon resins are given in the table below:

TABLE I

| Epon No. | Epoxide Equivalent | Approximate Esterification Equivalent | M. P., 0° C. |
| --- | --- | --- | --- |
| RN-34 | 225–290 | 105 | 20–28 |
| RN-48 | 192 | 80 | 9 |
| 1064 | 300–375 | 105 | 40–45 |
| 1062 | 140–165 | | Liquid |
| 1004 | 905,985 | 175 | 97–103 |
| 1007 | 1,600–1,900 | 190 | 127–133 |
| 1009 | 2,400–4,000 | 200 | 145–155 |
| 1001 | 450–525 | 130 | 64–76 |

Also, there may be used polyepoxides of the formula

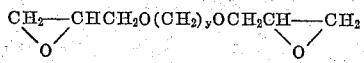

where $y$ is a number having an average value of 2 to 4. Epon 562 is of this type, is liquid at normal room conditions, and has an "Epoxide Equivalent" value of 140–165. Also, a diepoxide or triepoxide of glycerol may be used. These aliphatic polyepoxides may be prepared in known fashion as described, for example in U.S. Patents 2,730,427 or 2,752,269. The preferred polyepoxides are those having average molecular weights of about 250 to 1,000.

In preparing the final composition for coating purposes, the amount of polyepoxide incorporated is from 5 to 200%, and preferably from about 40 to 120% by weight, based on the weight of copolymer in the composition. The concentration of the solution may be anywhere from 1% to saturation in the solvents mentioned hereinbefore or mixtures thereof. For most coating purposes, concentrations of 10 to 60% are generally adequate.

The compositions of the present invention, whether they contain a polyepoxide or not, are quite stable on storage, being adapted to last without severe gelation for a period of several months. They may be employed in known fashion for providing coatings of outstanding impact resistance, particularly for the decoration of metals, wood, concrete and so forth. After application to the materials to be coated, the composition is dried either at room temperature or at elevated temperatures and cured at temperatures of 200° to 450° F. for periods of a few minutes, such as 3 to 5 minutes, at the upper temperature to one-half hour or more at the lower temperature. A temperature of at least 300° F. is preferred.

The compositions may be pigmented. They may also contain other materials such as phenol-aldehyde, urea-aldehyde, or melamine-aldehyde resins, to the extent that such materials are compatible therewith. For example, the incorporation of 1 to 15% by weight of an aminoplast, such as butylated polymethylol-melamine, provides modified coatings having improved resistance to detergents.

In the following examples which are illustrative of the invention, the parts and percentages are by weight unless otherwise indicated.

The epoxide resins referred to in the following examples are the following:

Epoxide A is a condensation product of epichlorohydrin with 4,4'-isopropylidene-bisphenol (commonly called Bisphenol A) having the characteristics following: an epoxy equivalent of about 500, an equivalent weight of about 130, melting point range 64° to 76° C., a viscosity at 25° C. and 50% in the monobutyl ether of diethylene glycol of about 3.5 poises, soluble in toluene, xylene.

Epoxide B is a condensation product of epichlorohydrin and 4,4'-isopropylidene-bisphenol having the following characteristics: an epoxy equivalent of about 193, an equivalent weight of about 75, a viscosity of about 148 poises (100% solids at 25° C.), a melting point of 8° to 12° C., soluble in toluene and xylene.

Epoxide C is a condensation product of epichlorohydrin with 4,4'-isopropylidene-bisphenol (commonly called Bisphenol A) having the following characteristics: an epoxy equivalent of about 280–350, an equivalent weight of about 105, a melting point range of 40° to 45° C., and a viscosity of about 0.3 to 0.7 poise at 25° C.

Epoxide D is a reaction product of glycerine and epichlorohydrin having the following characteristics: an epoxy equivalent (grams of resin containing 1 g.-equivalent of epoxide) of about 150, an equivalent weight of about 60 (grams of resin required to esterify 1 g.-mole of acetic acid), a viscosity at 25° C. of about E at 100% solids, soluble in water, methanol, acetone, benzene, and toluene.

Epoxide E is a condensation product of ethylene glycol and epichlorohydrin having the following characteristics: an epoxy equivalent of about 200, an equivalent weight of about 80, a viscosity of about Z–5 (100% solids at 25° C.), soluble in methanol, acetone, benzene, and toluene.

Example 1

A charge comprising 360.0 grams (60.0 weight percent) of ethyl acrylate, 144.0 grams (24.0 weight percent) of styrene, 90.0 grams (15.0 weight percent) of methacrylic acid, 6.0 grams (1.0 weight percent) of dimethylaminoethyl methacrylate and 6.0 grams (1.0% of total monomer charge) of azodiisobutyronitrile is added in the course of three hours to a glass reaction vessel containing 300.0 grams of xylene and 150.0 grams of diacetone alcohol maintained at 100° C. by means of external heating. The mixture in the flask is stirred during the addition and subsequent reaction and maintained at 100° C. under a nitrogen atmosphere. At three hours and at four and one-half hours after the polymerization has started, the reaction is recatalyzed with 0.6 gram portions of azodiisobutyronitrile and the temperature maintained at 100° C. for a total of twelve hours. A final dilution with 150.0 grams of xylene completes the polymerization cycle. The self-catalyzing resin is rendered stable with the addition of 435 grams of trifluoroacetic acid (one equivalent of acid to amine). The final resin is a clear, viscous solution having a Gardner-Holdt viscosity of (Z–5) at approximately 45.0% resin solids.

Example 2

The procedure of (1) hereof is repeated changing the proportions in the initial monomer charge to 360.0 grams (60.0 weight percent) of ethyl acrylate, 174.0 grams (29.0 weight percent) of styrene, 60.0 grams (10.0 weight percent) of methacrylic acid and 6.0 grams (1.0 weight percent) of dimethylaminoethyl methacrylate

Example 3

The procedure of (1) hereof is repeated changing the proportions in the initial monomer charge to 360.0 grams (60.0 weight percent) of ethyl acrylate, 114.0 grams (19.0 weight percent) of styrene, 120.0 grams (20.0 weight percent) of methacrylic acid and 6.0 grams (1.0 weight percent) of dimethylaminoethyl methacrylate.

Example 4

Mix 220 parts of the copolymer solution from Example 1 with 180 parts of a 50% solution in 2-ethoxyethyl acetate of Epoxide A. This composition is quite stable on storage being adapted to last without severe gelation for a period of several months.

The mixture is then cast on bonderized steel with a 5-mil film caster, allowed to air dry 15 minutes, and then baked 30 minutes at 300° F. The baked film has a pencil hardness of 3H. It has excellent adhesion to the bonderized steel. It shows excellent flexibility when bent over an ⅛-inch bar, and will not crack when subjected to 60-inch pounds reverse impact.

Example 5

Similar results are obtained when Example 4 is repeated replacing the epoxide with the same amount of Epoxide C or with two-thirds of the amount of Epoxide A, of Epoxide B or of Epoxide C.

Example 6

Similar results are obtained when Example 4 is repeated replacing the copolymer solution from Example 1 with either the copolymer solution from Example 2 or the copolymer solution from Example 3.

Example 7

Mix on a three-roll mill 200 parts of rutile titanium dioxide with 200 parts of a 50% solution in xylol:diacetone alcohol (3:1) of a styrene/ethyl acrylate/methacrylic acid/dimethylaminoethyl methacrylate (24:60:15:1 by weight ratio) copolymer which has been substantially neutralized by addition of 4.35 grams of trifluoroacetic acid, then mix into 300 parts of this paste 51.6 parts of the 50% solution of the above-mentioned copolymer and 165 parts of a 50% solution in 2-ethoxyethyl acetate of Epoxide A. The above composition is quite stable on storage being adapted to last without severe gelation for a period of several months.

Adjust to spray viscosity of 22 seconds (No. 4 Ford Cup) by adding a mixture of xylol and 2-ethoxyethyl acetate (3:1 volume ratio) giving a total solids concentration of 47%. Spray the composition on bonderized steel panels to give a film thickness of 0.0015 inch after a 15 minute air-dry and a 30-minute bake at 300° F.

The baked film has a pencil hardness of 3H. It has excellent adhesion to bonderized steel. It shows excellent flexibility when bent over an ⅛" bar, and it will not crack when subjected to 30 inch-pounds reverse impact. The initial gloss is 90+ as determined by a 60° Photovolt glossmeter. It shows good resistance to a detergent consisting essentially of a mixture of sodium dodecyl benzene sulfonate (about 20%), sodium tripolyphosphate (about 40%), tetrasodium phosphate (about 15%), and sodium sulfate (about 20%) when tested by immersion for 100 hours in a 1% solution of the aforesaid detergent.

I claim:
1. A composition comprising an organic solvent having dissolved therein
   (A) at least one linear addition copolymeric material selected from the group consisting of
      (1) a copolymer consisting of monoethylenically unsaturated copolymerizable monomers and having 3 to 15% by weight of dicarboxylic acid anhydride-containing units and 0.25 to 10% by weight of organic base-containing units selected from the group consisting of units having amine and quaternary ammonium groups in the form of a salt of an acid of the formula

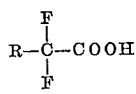

$$R-\underset{\underset{F}{|}}{\overset{\overset{F}{|}}{C}}-COOH \qquad (IV)$$

where R is selected from the group consisting of fluorine, bromine, chlorine, methyl, ethyl, halomethyl, and haloethyl,
      (2) a copolymer consisting of monoethylenically unsaturated copolymerizable monomers and having 5 to 25% by weight of units containing both carboxylic acid groups and and basic groups selected from the group consisting of amine and quaternary ammonium groups in the form of a salt of Formula IV, and
      (3) a blend of a copolymer consisting of monoethylenically unsaturated copolymerizable monomers and having 1 to 35% by weight of carboxylic acid-containing units and a copolymer consisting of monoethylenically unsaturated copolymerizable monomers and having 0.25 to 10% by weight of organic base-containing units selected from the group consisting of units having amine and quaternary ammonium groups in the form of a salt of an acid of Formula IV, and
   (B) from 5 to 200% by weight of the copolymeric of a resin-forming polyether containing a plurality of vic-epoxide groups.

2. A composition as defined in claim 1 in which the carboxylic acid is an acid of the formula $$H_2C=C-(CH_2)_{n-1}H$$
$$\phantom{H_2C=}\overset{|}{COOH}$$

wherein $n$ is an integer having a value of 1 to 2.

3. A composition as defined in claim 1 in which the anhydride is maleic anhydride.

4. A composition as defined in claim 1 in which the amine units of the copolymer are those derived from dimethylaminoethyl methacrylate.

References Cited by the Examiner

UNITED STATES PATENTS

| | | | |
|---|---|---|---|
| 2,662,870 | 12/53 | Allenby | 260—41 |
| 2,680,717 | 6/54 | Little | 260—86.1 |
| 3,037,955 | 6/62 | Carman | 260—86.1 |

MURRAY TILLMAN, *Primary Examiner.*

LEON J. BERCOVITZ, *Examiner.*